United States Patent
Williams et al.

(10) Patent No.: US 7,080,035 B1
(45) Date of Patent: Jul. 18, 2006

(54) SYSTEM AND METHOD FOR NOTIFYING AN ELECTRONIC BILLING VENDOR OF A CUSTOMER STATUS CHANGE

(75) Inventors: Bill E. Williams, Hoover, AL (US); Eugene E. Owen, Jr., Alabaster, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 09/531,571

(22) Filed: Mar. 20, 2000

(51) Int. Cl.
*G06F 17/60* (2006.01)

(52) U.S. Cl. ............... 705/40; 705/35; 705/37; 705/42

(58) Field of Classification Search ......... 705/40, 705/36, 35, 42
See application file for complete search history.

(56) References Cited

U.S. PATENT DOCUMENTS

| | | | | |
|---|---|---|---|---|
| 5,873,072 | A | * | 2/1999 | Kight et al. ............ 705/40 |
| 5,893,088 | A | * | 4/1999 | Hendricks et al. ....... 707/3 |
| 6,125,349 | A | * | 9/2000 | Maher ................... 705/1 |
| 6,128,602 | A | * | 10/2000 | Northington et al. .... 705/35 |
| 6,385,623 | B1 | * | 5/2002 | Smith et al. .......... 707/200 |
| 6,587,836 | B1 | * | 7/2003 | Ahlberg et al. ........ 705/26 |
| 6,711,624 | B1 | * | 3/2004 | Narurkar et al. ....... 719/321 |
| 6,778,651 | B1 | * | 8/2004 | Jost et al. ........... 379/201.01 |
| 2001/0011245 | A1 | * | 8/2001 | Duhon .................. 705/38 |
| 2001/0049632 | A1 | * | 12/2001 | Rigole ................. 705/26 |

FOREIGN PATENT DOCUMENTS

WO  WO 97/03410  * 1/1997

OTHER PUBLICATIONS

Billing Services Aren't The Same Old Song & Dance (Company Business and Marketing); Wireless Data News, v8, n5;Mar. 1, 2000.*

* cited by examiner

*Primary Examiner*—Jagdish N Patel
(74) *Attorney, Agent, or Firm*—Withers & Keys, LLC (57) ABSTRACT

A system and method by which a merchant automatically notifies an outside e-billing vendor of customer account status changes that affect the transfer of billing information between the merchant and the e-billing vendor. The method reads an update file containing service order activities, searches among the activities in the update file for customers enrolled in an e-billing service, determines which of those enrolled customers received a service change that affected their account number, pulls the information associated with each affected account number, places the information in a record formatted as required by the e-billing vendor, and transmits the record to the e-billing vendor to synchronize the account numbers between the merchant and the e-billing vendor.

10 Claims, 9 Drawing Sheets

| Field Name | Start Position | Field Length | Comments |
| --- | --- | --- | --- |
| Record Type | 1 | 1 | "3" |
| Future Use | 2 | 10 | |
| Action Code | 12 | 2 | A- Activate, D - Delete, C - Change |
| Activity Date | 14 | 8 | (YYYYMMDD) |
| Future Use | 23 | 13 | |
| Last Name | 35 | 35 | |
| First Name | 70 | 25 | |
| Middle Name | 95 | 25 | |
| Address Line 1 | 120 | 35 | |
| Address Line 2 | 155 | 35 | |
| City | 190 | 30 | |
| State Abbreviation | 220 | 2 | |
| Zip Code | 222 | 15 | |
| Future Use | 237 | 20 | |
| Account Number | 257 | 30 | |
| Old Account Number | 287 | 30 | For Use with Change of Account Records. If this field is populated the new Account number should appear in the previous field. This field would only be populated if there is a "C" in the Action Code Field. |
| Future Use | 317 | 184 | |
| | | | |

SYSTEM AND METHOD FOR NOTIFYING AN ELECTRONIC BILLING VENDOR OF A CUSTOMER STATUS CHANGE

BACKGROUND

1. Field of the Invention

The present invention relates to coordinating information between a merchant and an outside vendor that provides a web-based electronic billing service for customers of the merchant. More specifically, the present invention relates to a system and method for automatically notifying the outside vendor of a change in customer status when a customer contacts the merchant to change her service but fails to contact the outside vendor.

2. Background of the Invention

Enabled by the development of the Internet, more and more merchants are offering their customers the ability to access billing account information and to pay bills online. Often, to provide this service, merchants contract with web-based billing and payment service providers (referred to herein as "e-billing vendors"). Instead of issuing paper bills, merchants electronically forward billing information to the e-billing vendors, who then post periodic bills on the Internet. Once posted on the Internet, the e-billing vendors provide secured access through which customers can review their own accounts, but not the accounts of other customers. E-billing vendors also often manage electronic fund transfers between customer financial accounts and merchant accounts. In dispensing with paper-based checks, these e-billing vendors, such as CheckFree®, enable customers to complete such transactions as paying bills online, accessing full payment histories, scheduling payments in advance, scheduling variable and recurring payments, reviewing pending payments, authorizing payments to particular merchants, and storing bills electronically for future reference.

For enrollment in an electronic billing and payment service, the merchant instructs its existing customers to log onto the e-billing vendor's website and register for the service. The customer designates the financial institution that will receive and pay the customer's bills, and the particular financial account number through which fund transfers will be processed. The financial institution is any business that supports electronic billing and payment, such as online banks, Internet portals, brokerage credit unions, and personal finance software packages. As a part of enrollment, the e-billing vendor furnishes the customer with a user identification ("user ID") and password for secured access to the website. The e-billing vendor also establishes a mailbox for the customer, accessible only by using the user ID and password. This mailbox serves as the location at which the e-billing vendor presents bills for payment, and the customer reviews and pays bills.

Once the customer completes registration, the e-billing vendor forwards the registration information to the merchant in the form of a request-for-enrollment file. The merchant validates and edits the request-for-enrollment file, qualifies the customer, and returns a response file to the e-billing service reporting either that the customer's account is ready for electronic fund transfers or that the request for enrollment is denied (e.g., if the account number is invalid or if the enrollee is not a customer of the merchant). If enrollment is accepted, the merchant activates the e-billing capabilities for the customer's account and modifies its internal accounting system to forward the customer's bills to the e-billing vendor, rather than to the customer by mail. For tracking purposes, the merchant and e-billing vendor generally use the service account number assigned to the customer by the merchant, e.g., in the case of a telephone company, the service account number would be the customer's telephone number. The e-billing vendor associates this account number with the previously registered user ID, password, financial institution, financial account number, and mailbox of the customer.

Following enrollment, for each billing cycle (e.g., monthly), the merchant electronically forwards the billing information in a bill image data file to the e-billing vendor, preferably using file transfer protocol (FTP). By reading the account number associated with the bill image data file, the e-billing vendor locates the customer's mailbox. The e-billing vendor then web-enables the bill image data file by attaching hypertext markup language (HTML) commands and posts the bills to the mailbox for presentment and payment. Once posted, the customer can review the charges and approve the transfer of funds from her financial account to the merchant. For quality control, the e-billing vendor confirms during each billing cycle that billing information is received for each active enrolled customer, to assure that each customer can review and pay bills in a timely manner.

Because a merchant typically issues bills to different customers on different billing cycles such that bills go out every day, merchants transfer billing information to the e-billing vendor on a daily basis. As a part of the tracking and quality control functions, the e-billing vendor and merchant provide each other with error reports for each daily transfer. The error reports detail instances in which, for example, customer accounts do not match or cannot be located. Although the error reports enable the merchant and the e-billing vendor to identify mismatched account numbers and to make the appropriate corrections to synchronize the systems, the reports require a manual review by the system operators and do not eliminate the need for further personal communication between the merchant and e-billing vendor to rectify the problems.

The principal source of errors in these daily transfers of billing information is customer-requested changes in service that affect account numbers. Because the merchant and the e-billing vendor rely on the account number to synchronize a transfer, if a customer desires a change in service that affects her account number, both the merchant and also the e-billing vendor must be notified to ensure consistent billing. For such a situation, e-billing vendors instruct customers to always contact both the merchant and also the e-billing vendor to report the change. In this manner, the merchant knows to issue any subsequent billing based on the requested change and the e-billing vendor knows what type of billing information to expect from the merchant. Two typical examples of changes in service that affect the account number are account termination and account number change. To better illustrate these changes in the context of a particular industry, the following discussion addresses these service changes in the context of the telecommunications industry, in which an account termination is a disconnected telephone line and an account number change is a change of phone number (account number).

Figure 1:
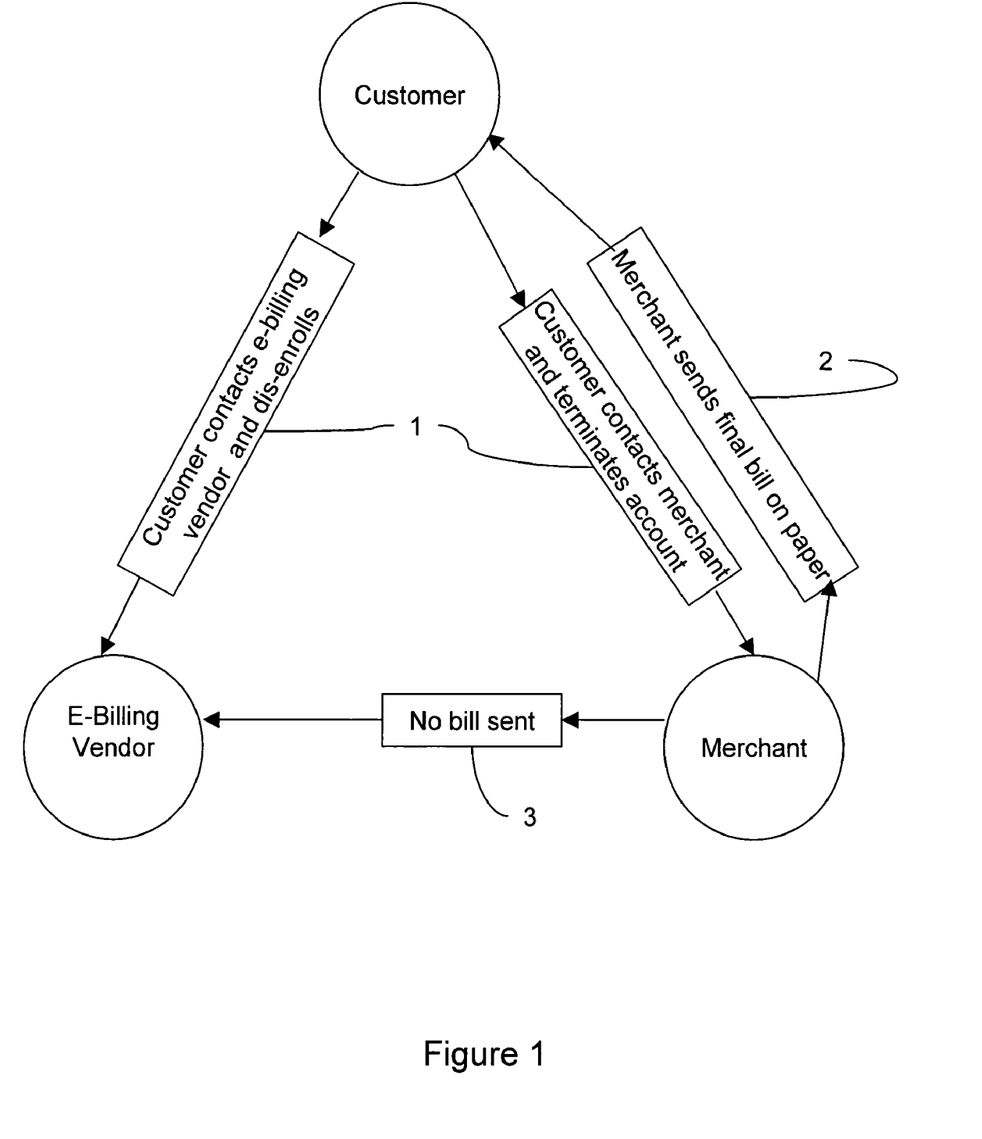
FIG. 1 is a schematic diagram illustrating the method by which customers should notify a telephone company and the e-billing vendor of a terminated account.
Figure 2:
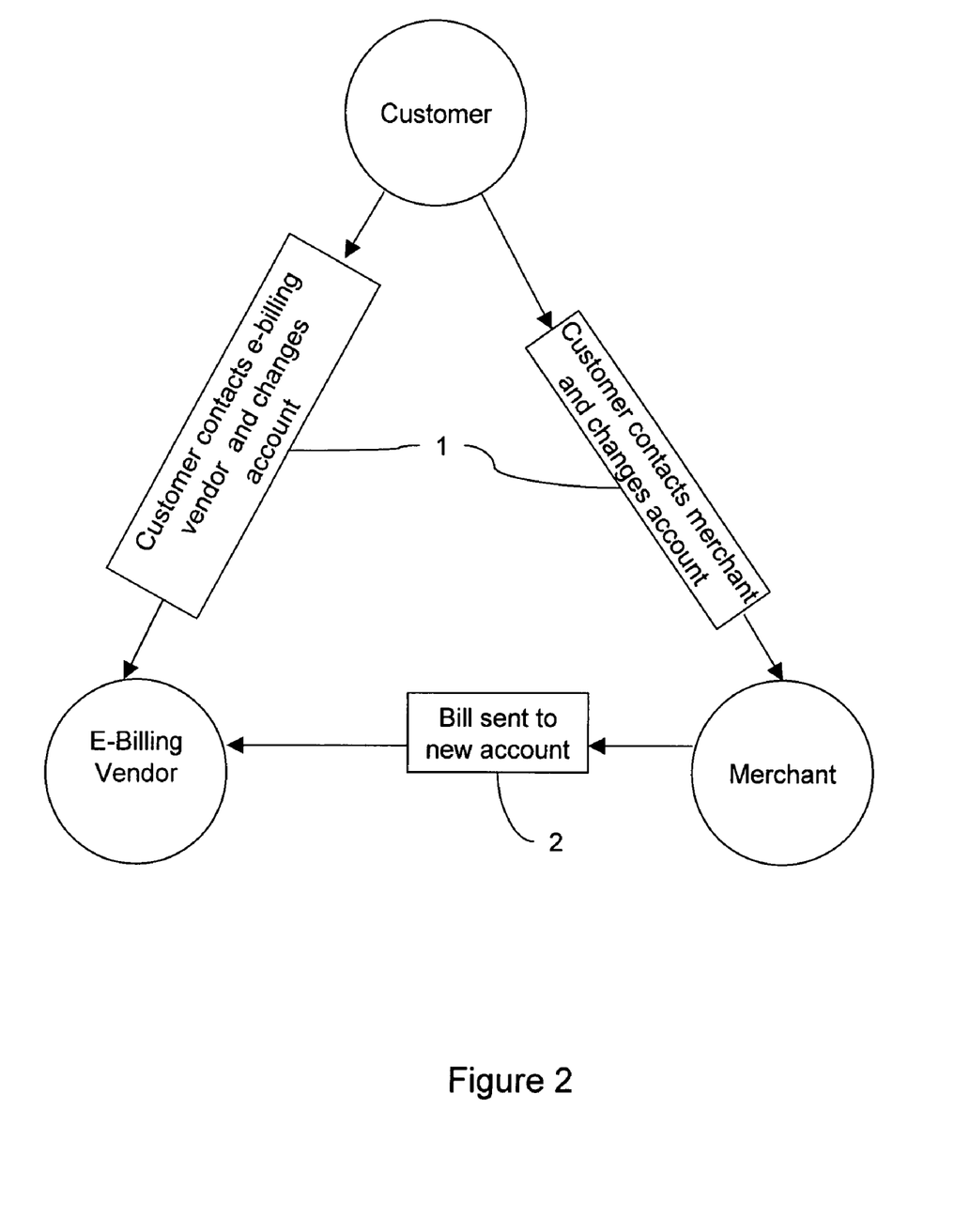
FIG. 2 is a schematic diagram illustrating the method by which customers should notify a telephone company and the e-billing vendor of an account number change.

If a customer follows the merchant's instructions, both the e-billing vendor and the merchant know that an account number has been canceled or changed, and can coordinate their billing processes accordingly. FIGS. 1 and 2 illustrate this situation in which a conscientious customer contacts the merchant and the e-billing vendor to coordinate a disconnected line (FIG. 1) or an account change (FIG. 2). The reference numerals in FIGS. 1 and 2, as well as FIGS. 3–6, indicate the order in which the steps occur.

Figure 3:
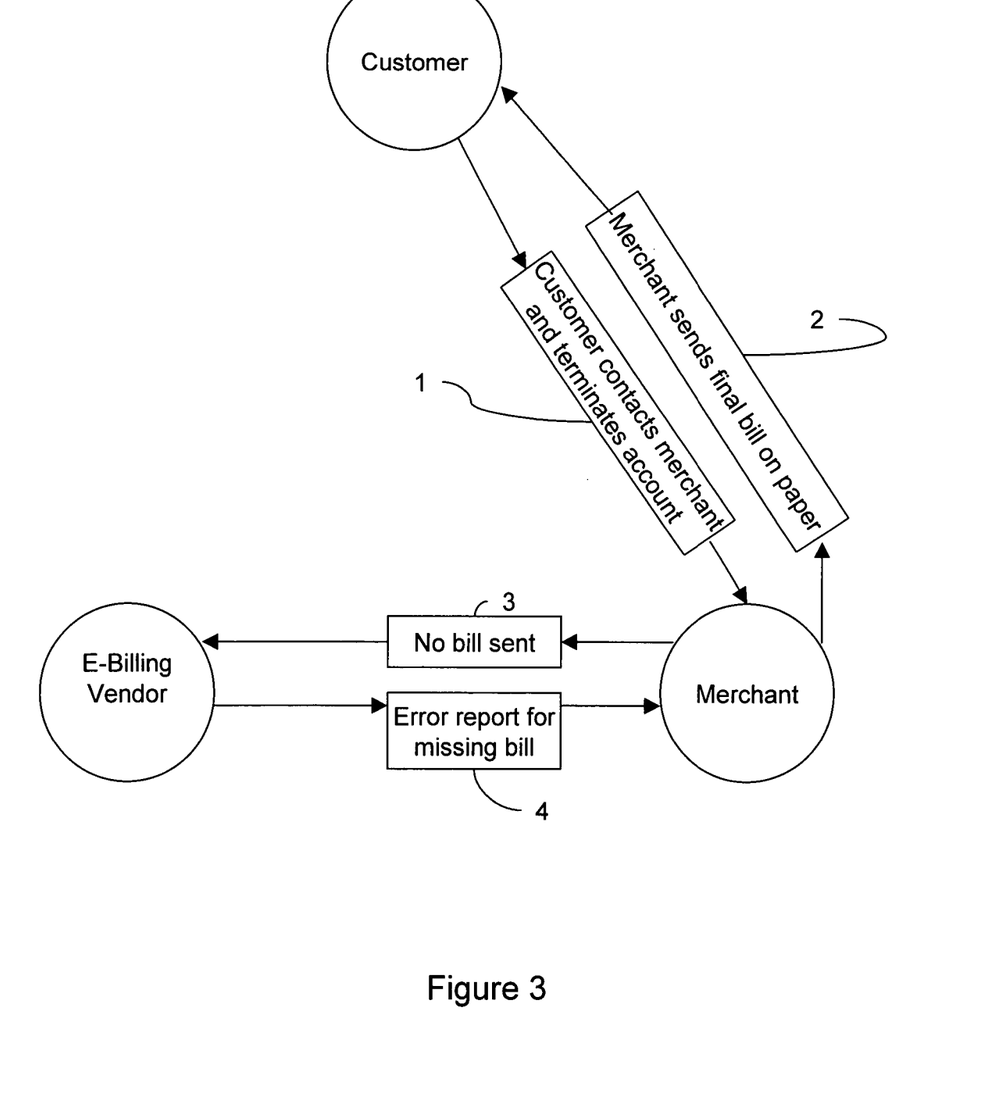
FIG. 3 is a schematic diagram illustrating the method by which customers typically only notify a telephone company of a terminated account.

Despite the merchant's best efforts in instructing customers, customers frequently request the change from the merchant but neglect to contact the e-billing vendor. FIG. 3 shows an example of this scenario for account termination. If a customer contacts the telephone company to disconnect her telephone line but does not inform the e-billing vendor of the change, when the next billing cycle comes due, the e-billing vendor will expect the usual bill from the telephone company, but the telephone company will forward nothing. As a result, an error will appear on the error report and the e-billing vendor will have to contact the telephone company to investigate the missing billing information. This investigation is a burdensome clerical task.

Figure 4:
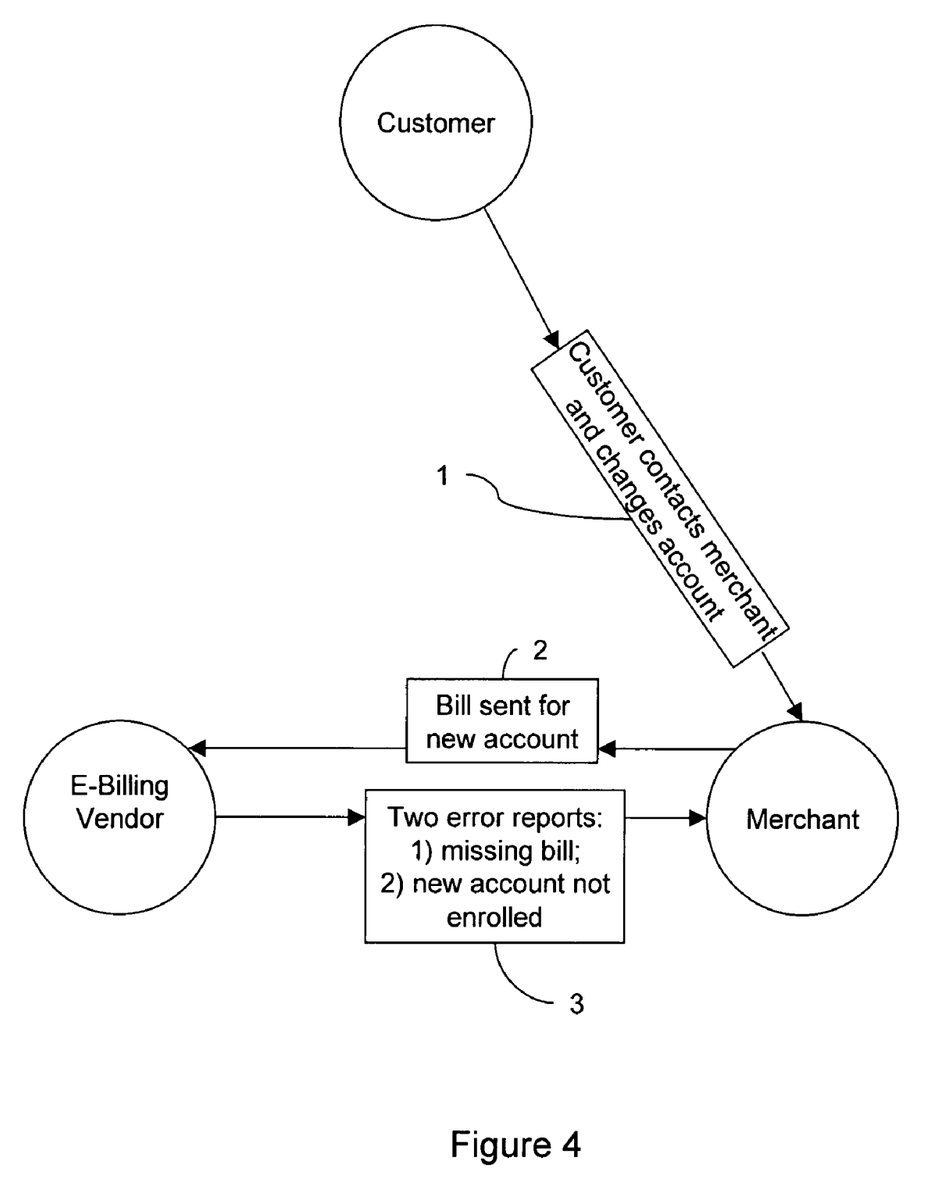
FIG. 4 is a schematic diagram illustrating the method by which customers typically only notify a telephone company of an account number change.

Similarly, FIG. 4 shows an example of the problematic scenario for account number change. Here, a customer contacts only the telephone company to switch her service from one telephone number to another—in effect canceling an account and opening another. As a result, during the next billing cycle, the e-billing vendor will receive billing information for the new account that it has not registered and does not recognize. In addition, the e-billing vendor will be looking for missing billing information for the cancelled account. Once again, the error report will indicate the mistakes and the e-billing vendor will have to waste resources contacting the merchant to coordinate the changes.

Therefore, because customers inevitably fail to contact both the merchant and the e-billing vendor when requesting a service that affects an account number, the merchant needs a way of automatically notifying the e-billing vendor without resorting to manually reviewed error reports and post hoc clerical fixes.

SUMMARY OF THE INVENTION

The present invention is a system and method for a merchant to automatically notify an outside e-billing vendor of customer account status changes that affect the transfer of billing information between the merchant and the e-billing vendor. The method of the present invention reads an update file containing service order activities, searches among the activities in the update file for customers enrolled in an e-billing service, determines which of those enrolled customers received a service change that affected their account number, copies the information associated with each affected account number into a record formatted as required by the e-billing vendor, and transmits the record to the e-billing vendor to synchronize the merchant and e-billing vendor accounts.

To implement this method, the primary components of the system include an update file, a search application, a format application, a communication application, a network, and an e-billing vendor. The update file contains, among other customer information, records of executed customer service orders occurring during a predetermined interval, preferably daily. The search application reads the update file, searches for service orders performed for customers enrolled in an e-billing service, and records account change information in a notification file. The format application configures the notification file in a format compatible with the e-billing vendor. The communication application sends the notification file to the e-billing service application through the network. Finally, the e-billing vendor updates the customer e-billing account information using the data provided by the notification file.

Figure 5:
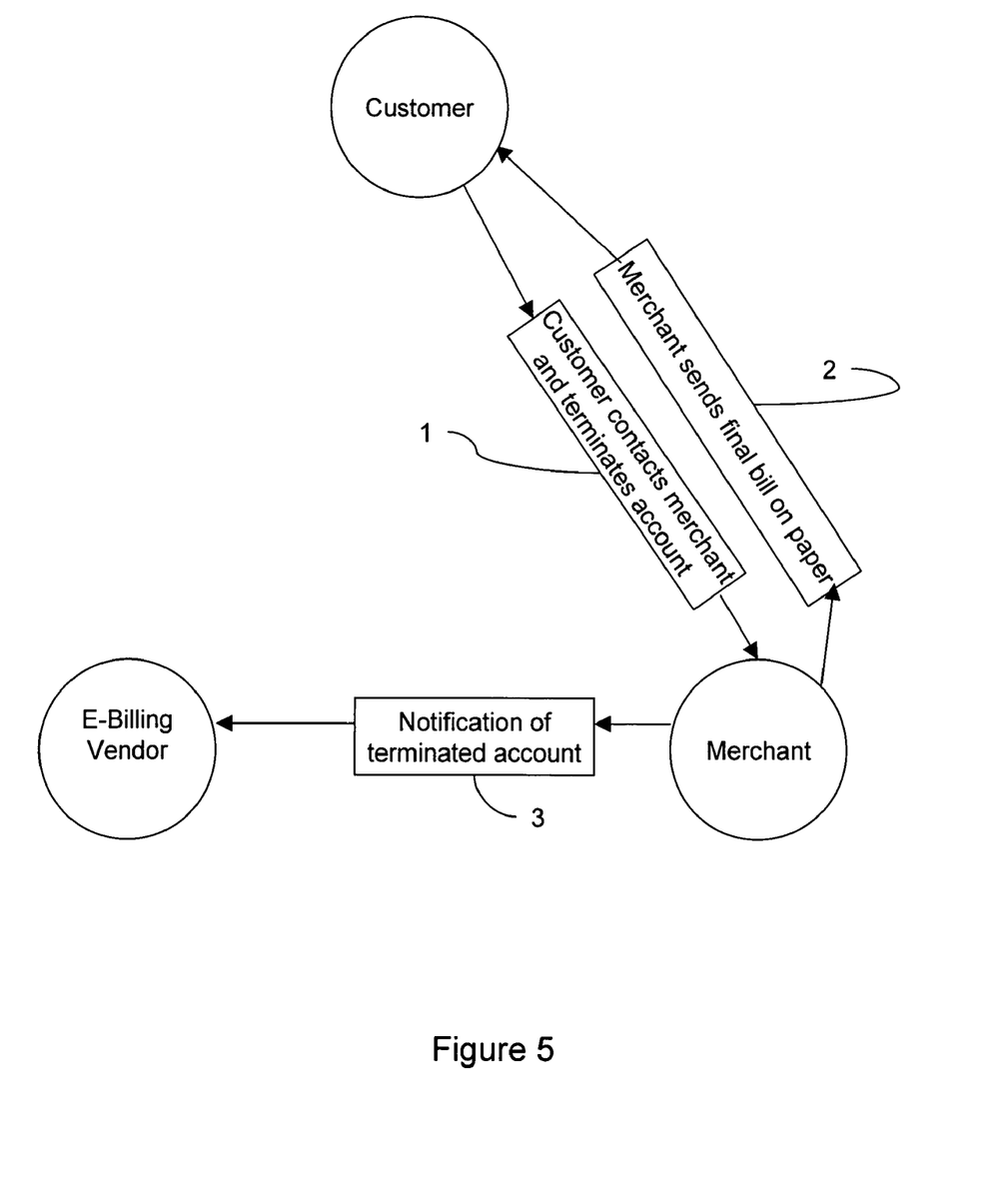
FIG. 5 is a schematic diagram illustrating a preferred embodiment of a method according to the present invention for terminated accounts.
Figure 6:
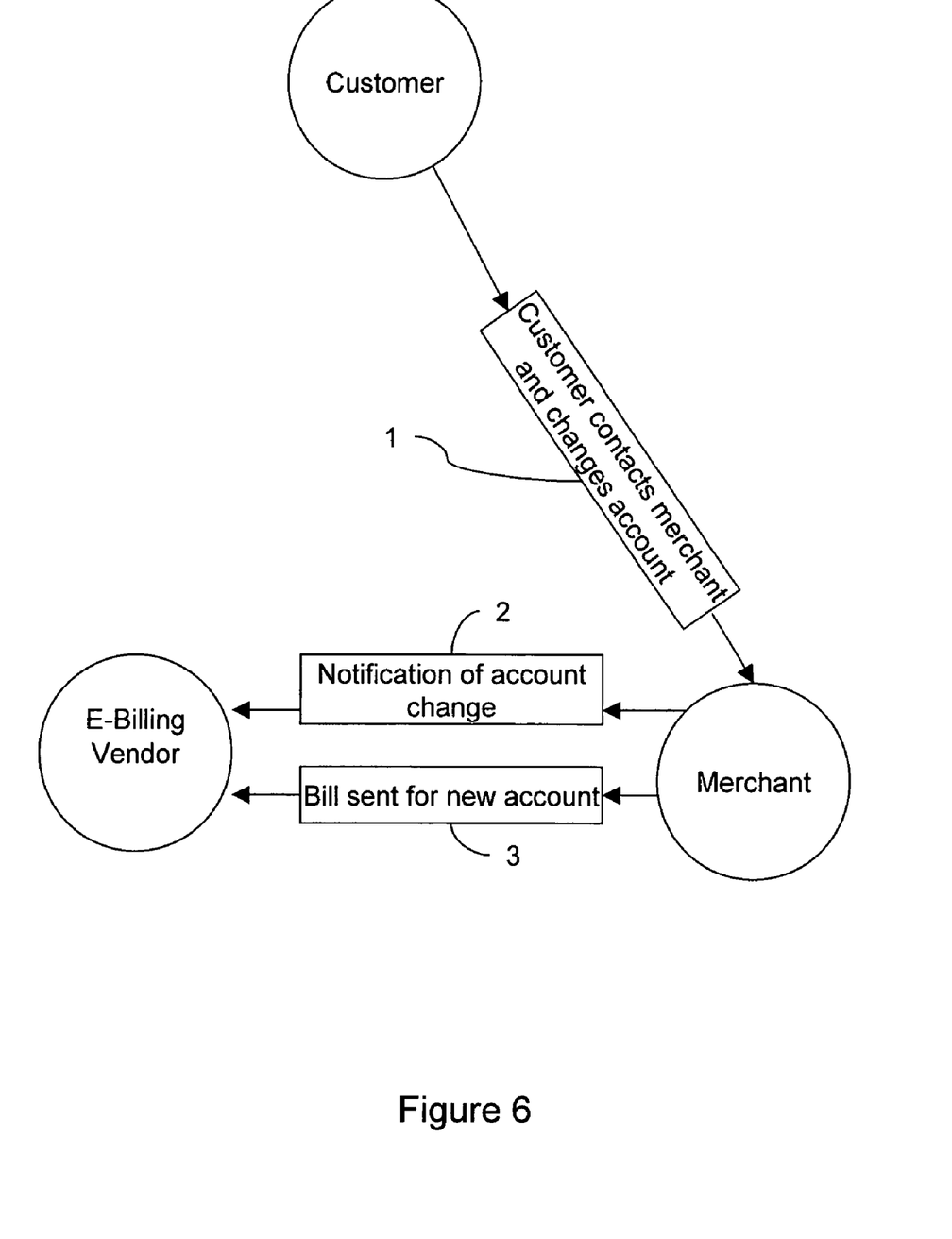
FIG. 6 is a schematic diagram illustrating a preferred embodiment of a method according to the present invention for an account number change.

FIGS. 5 and 6 broadly illustrate the method by which the present invention synchronizes the merchant and e-billing vendor accounts. For account termination, FIG. 5 shows generally that upon disconnecting a customer's telephone line, the telephone company (merchant) issues a final paper bill to the customer, and automatically notifies the e-billing vendor of the account termination. Consequently, the e-billing vendor cancels the telephone bill portion of the customer's online billing service and confirms that no further billing information is expected from the telephone company. Thus, the disconnection will not result in an entry on the error report.

With regard to an account number change, FIG. 6 shows generally that upon changing account numbers, the telephone company (merchant) sends to the e-billing vendor a notification of the account change followed by the billing information for the new account. The notification reports the cancellation of the original account number and the establishment of the new account under the customer's name. As a result, the e-billing vendor recognizes that no further billing information will be forthcoming for the original account and that future billing information will be forthcoming for the new account. Thus, the e-billing vendor will not generate any entries on the error report.

Accordingly, it is an object of the present invention to provide a system and method for a merchant to automatically notify an outside e-billing vendor of a change in customer status when a customer contacts the merchant to change her service but does not contact the outside e-billing vendor.

It is another object of the present invention to provide a system and method for automatically synchronizing account information between merchants and their e-billing vendors.

It is another object of the present invention to help reduce error reports generated by customers who do not contact both a merchant and its associated e-billing vendor to request and report service changes that affect their accounts.

These and other objects of the present invention are described in greater detail in the detailed description of the invention, the appended drawings, and the attached claims.

DETAILED DESCRIPTION OF THE INVENTION

Figure 7:
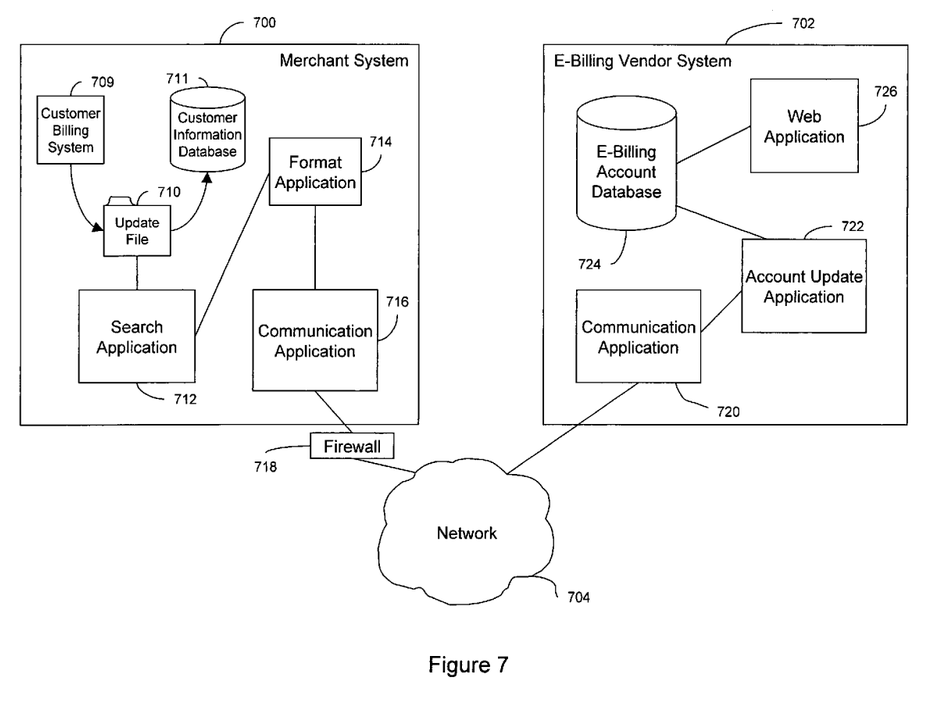
FIG. 7 is a schematic diagram of a preferred embodiment of a system architecture according to the present invention.

System Architecture:

FIG. 7 is a preferred embodiment of the present invention. On the most general level, the system architecture of the preferred embodiment of the present invention enables applications of a merchant system 700 to communicate with applications of an e-billing vendor system 702 through a network 704. Network 704 is preferably the Internet.

In a preferred embodiment of the present invention, merchant system 700 includes an update file 710, a search application 712 in communication with update file 710, a format application 714 in communication with search application 712, and a communication application 716 in communication with format application 714 and network 704.

E-billing vendor system 702 includes a communication application 720 in communication with network 704, an account update application 722 in communication with communication application 720, an e-billing account database 724 in communication with account update application 722, and a web application 726 in communication with e-billing account database 724. Although the components within merchant system 700 and e-billing vendor system 702 are shown separately, one skilled in the art would appreciate that the components of each could be combined into a single application or a single hardware component.

Within this architecture, the components perform the following functions. Update file 710 stores the merchant's service order activities as well as other customer update information. Examples of the service order activities include the addition or deletion of service features, routine service inquiries by customers (e.g., repair requests), account number changes, and account termination. Each entry in update file 710 is associated with a customer account number, and includes a flag (or other indicator) if the entry corresponds to an electronic billing customer, and a description, code, or other indicator to mark a service activity that affects an account number(s).

At a predetermined time interval, for example, at the close of business of each day, the activities (and other customer update information) for that time interval are downloaded to update file 710. Any number of suitable applications can receive and record the service activities, and download the activities to the update file 710. However, in a preferred embodiment of the present invention, a customer billing system 709 receives and records service activities and downloads the activities, in the form of update file 710, to a customer information database 711. Customer billing system 709 maintains billing records for customers and produces cyclical billing statements for each customer. Customer billing system 709 is preferably a system software including COBOL and Assembly language programs running on an IBM 370 Mainframe, such as the Customer Record Information System (CRIS) of BellSouth, Atlanta, Ga. Customer information database 711 is in communication with customer billing system 709 and stores the customer data that customer billing system 709 accesses and updates.

While update file 710 is being downloaded from customer billing system 709 to customer information database 711, search application 712 reads the service order activity files from update file 710 and searches for entries associated with e-billing service customers and with service orders that affect account numbers. Search application 712 then copies the entries that meet the search criteria into a notification file, and forwards the notification file to format application 714 or to a server accessible to format application 714.

In a preferred embodiment of the present invention, search application 712 is a Unitech™ software package application that runs on an IBM 370 Mainframe. Preferably, once search application 712 reads the update file 710 and collects the entries satisfying the search criteria into a notification file, search application 712 transmits the notification file to a server in communication with format application 714, using a file transfer protocol that supports file transfer between servers.

In a further preferred embodiment of the present invention, search application 712 searches several update files generated in several separate regional operating sites. In this embodiment, search application 712 reads the multiple update files and collects the service order activities meeting the search criteria. A file transfer system running on an IBM 370 Mainframe transfers the service order activities from each regional operating site to a central server, on which a standard software utility (e.g., IBM's IEBGENER) merges the service order activities into the notification file. The notification file is then transmitted to a server in communication with format application 714, using a file transfer protocol that supports file transfer between servers.

Figure 8:
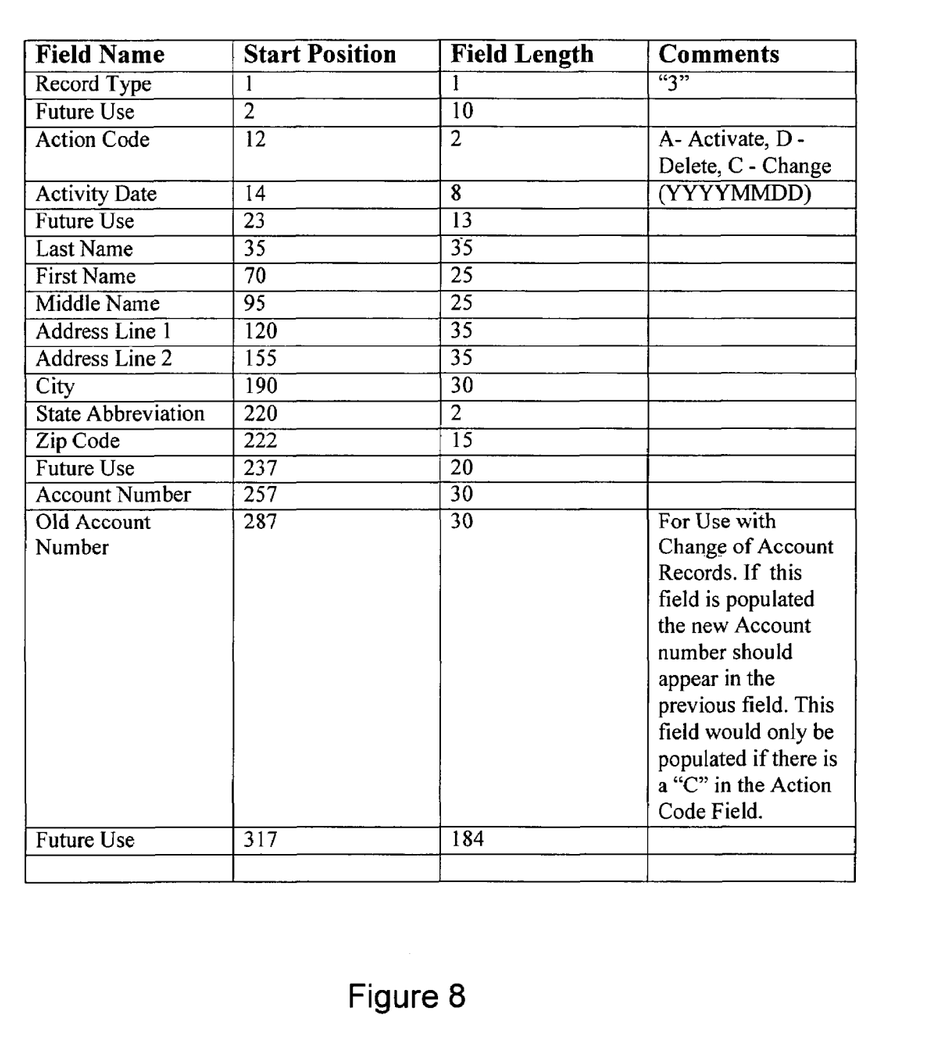
FIG. 8 is a table describing an example of a record format required by an e-billing account database.

Format application 714 translates files (and data entries in the files) configured in the record format of update file 710 into the record format required by e-billing account database 724. The record format required by e-billing account database 724 can be any suitable format. Preferably, the e-billing vendor record format includes one or more of customer contact information, type of service activity performed ("action"), and account numbers. As an exemplary embodiment of the present invention, the table in FIG. 8 lists a record format required by an e-billing vendor. As shown in FIG. 8, the record format conveys, among other things, the customer's contact information, the type of service activity performed ("action"), the date of the service activity, and the old and new (if applicable) account numbers involved in the service activity. The action codes correspond to service activities that affect account numbers, namely, "activate," "delete," and "change." In the preferred embodiment of the present invention, format application 714 is written with Microsoft Access™.

Once the notification file has been formatted, format application 714 sends the notification file to communication application 716. Communication application 716 preferably uses File Transfer Protocol (FTP—a standard Internet protocol) to forward the notification file through network 704 to communication application 720 of e-billing vendor system 702, as shown in FIG. 7. Preferably, for security, communication application 716 also forwards the notification file through a firewall 718 separating merchant system 700 from e-billing vendor system 702.

Communication application 720 receives the notification file, preferably using FTP, and forwards it to account update application 722. Once e-billing vendor system 702 has received the notification file, e-billing vendor system 702 updates the customer information stored on its own system. Preferably, the following components assist e-billing vendor system 702 in updating its customer information.

Account update application 722 reads each entry in the notification file and, using the account number, consults e-billing account database 724 for the corresponding e-billing customer account. Based on the action noted in the notification file, account update application 722 updates e-billing account database 724. For example, for a changed account number, account update application 722 would cancel the old customer account in e-billing account database 724 and establish a new customer account under the new account number provided by the notification file.

With e-billing account database 724 updated, web application 726 accesses the new account information and posts it in individual mailboxes on the website.

Figure 9:
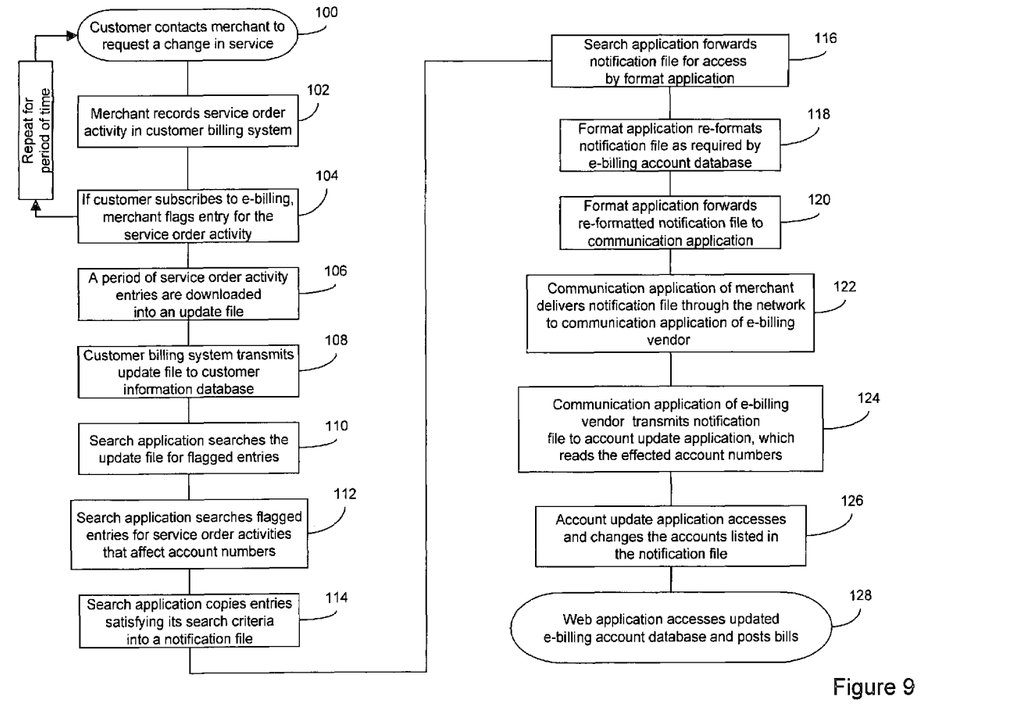
FIG. 9 is a flowchart outlining a preferred embodiment of a method according to the present invention.

System Operation:

FIG. 9 is a flowchart outlining the method implemented by the above-described system architecture. The flowchart tracks an example service activity from the request by the customer through notification of the e-billing vendor and adjustment of the website postings.

While the method described herein and illustrated in the flowchart contains many specific examples of information flow steps, these steps should not be construed as limitations on the scope of the invention, but rather as examples of method steps that could be used to practice the invention. As would be apparent to one of ordinary skill in the art, many other variations on the system operation are possible, including differently grouped and ordered method steps. Accordingly, the scope of the invention should be determined not by the embodiments illustrated by these examples, but by the appended claims and their equivalents.

As shown in FIG. 9, in step 100, a customer contacts merchant system 700 to request a change in service. As in a normal course of operation, in step 102 merchant 300 records the service order activity in customer billing system 709. If the customer is a participant in an e-billing service, customer billing system 709 flags the entry for the service order activity in step 104.

Steps 100 through 104 repeat in response to different service request calls from different customers. Then, at some periodic interval, for example once a day at the close of business, the merchant's customer billing system 709 downloads the service activity entries for that interval (e.g., that day) to update file 710 in step 106.

In step 108, customer billing system 709 transmits update file 710 to merchant's customer information database 711.

In step 110, as update file 710 is being transmitted from customer billing system 709 to customer information database 711, search application 712 reads update file 710 and searches for flagged entries, indicating customers who use an e-billing service. In step 112, search application 712 conducts a search of only the flagged entries to determine which entries report service order activities that affect account numbers. This second search yields entries detailing such activities as terminated accounts and changed accounts, which, in the context of the telecommunications industry described herein, correspond to disconnected lines and changed telephone numbers, respectively. Search application 712 identifies these entries by searching the descriptions, codes, or other indicators noting activities that affect account numbers.

Optionally, instead of searching first for customers that use e-billing, the present invention could search first for activities that affect account numbers and, of those entries, search for e-billing customers. In any case, the optimal search method searches for the more limiting criterion first, e.g., if typically there are more entries for activities that affect account numbers than there are for e-billing customers, then preferably search application 712 would search first for the entries corresponding to e-billing customers.

In step 114, once search application 712 has identified entries satisfying its search criteria, search application 712 collects the identified entries into a notification file. In the case of multiple operating regional sites, search application 712 collects the entries from each site and transmits them using a file transfer system to a central location (e.g., a central server), where the entries are merged into the notification file.

In step 116, search application 712 forwards the notification file to format application 714 or to a server accessible to format application 714. In step 118, format application 714 translates the record format of the notification file—which is in the format required by update file 710—into the record format required by e-billing account database 724. In step 120, format application 714 forwards the re-formatted notification file to communication application 716.

In step 122, communication application 716 of merchant system 700 delivers the notification file through network 704 to communication application 720 of e-billing vendor system 702. Preferably, network 704 is the Internet and communication applications 716 and 720 support File Transfer Protocol (FTP).

In step 124, communication application 720 transmits the notification file to account update application 722, which reads the affected account numbers. Then, in step 126, account update application 722 consults e-billing account database 724, accesses the accounts corresponding to the affected account numbers, and applies the changes noted in the notification file. Thus, for example, if the action code of an entry in the notification file is "D" to indicate a deleted account, account update application 722 closes that portion of the e-billing account so that e-billing vendor system 702 no longer expects billing information from merchant system 700 for that account. As another example, if the action code is "C" to indicate a changed account, account update application 722 closes the e-billing account corresponding to the old account number and opens an e-billing account for the new account number.

Finally, with the accounts updated, in step 128 web application 726 accesses e-billing account database 724 to post bills in a customer's mailbox on the website of e-billing vendor system 702.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for notifying an electronic billing vendor of customer status changes that involve account numbers stored for customers, comprising:

receiving service orders from the customers specifying one or more activities, wherein one or more of the service orders requires an account number change and wherein a billing computer system of the electronic billing vendor utilizes the account number being changed;

creating electronic service order entries within a service order computer system of a service provider based on the received service orders, wherein information is included within each electronic service order entry to indicate that the account number has changed for the customer when the service order results in the account number change;

flagging the electronic service order entries that correspond to electronic billing customers so that the flagged electronic service order entries correspond to electronic billing customers and electronic service order entries that are not flagged correspond to non-electronic billing customers;

storing the electronic service order entries in an update computer file;

searching the update computer file for flagged entries that include the information that indicates an account number change;

creating a new file that includes the flagged electronic service order entries that include the information that indicates an account number change that have been found by the search;

reformatting the flagged electronic service order entries of the new file that include the information that indicates account number changes to a record format compatible with the billing computer system of the electronic billing vendor; and transmitting the reformatted flagged entries of the new file that include the information that indicates account number changes over a computer network to the billing computer system of the electronic billing vendor.

2. The method of claim 1, wherein creating electronic service order entries comprises creating one electronic service order entry for each activity of each service order.

3. The method of claim 1, wherein storing the electronic service order entries comprises placing the electronic service order entries in the update computer file at an interval.

4. The method of claim 1, wherein searching the update computer file comprises looking first for the flagged entries, and looking second for the account number changes among the flagged entries.

5. The method of claim 1, wherein searching the update computer file comprises looking first for entries indicating account number changes, and looking second for the flagged entries among the entries indicating account number changes.

6. The method of claim 1, wherein the record format includes data selected from the group consisting essentially of date of activity, customer contact information, old account number, new account number, and action.

7. The method of claim 6, wherein the action is an activity selected from the group consisting essentially of delete, change, and activate.

8. The method of claim 1, wherein transmitting the flagged electronic service order entries that indicate account number changes to the billing computer system of the electronic billing vendor occurs through the computer network using file transfer protocol.

9. The method of claim 1, wherein receiving service orders from customers involves receiving a request for the account number changes that are selected from the group consisting essentially of an account termination and an account number change.

10. The method of claim 1, further comprising:

receiving the new file with the reformatted electronic service order entries at the billing computer system of the electronic vendor;

modifying customer records of the billing computer system according to the electronic service order entries including modifying the account numbers for customers; and generating electronic bills for the customers based on the modified account numbers.

\* \* \* \* \*